June 14, 1960
D. J. BURKE
2,940,885
PLASTIC MOLDING MATERIAL
Filed Aug. 31, 1955
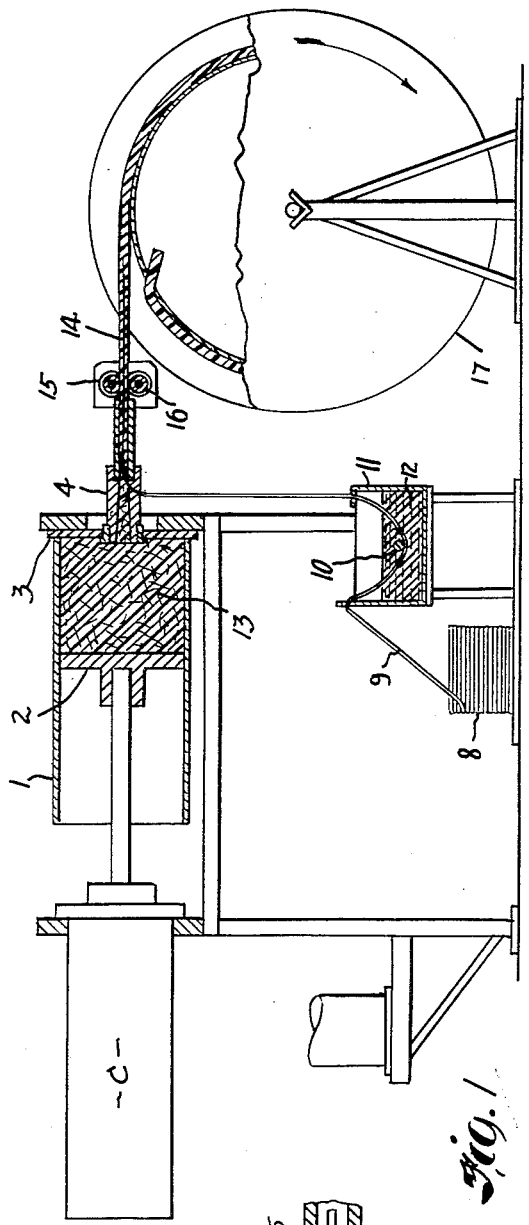
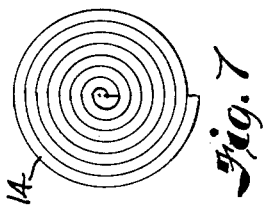
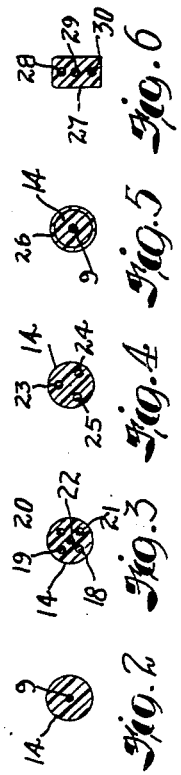
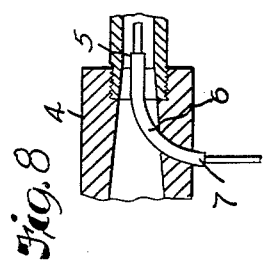
INVENTOR.
DONALD J. BURKE
BY
Oberlin & Limbach
ATTORNEYS.

United States Patent Office 2,940,885
Patented June 14, 1960

2,940,885

PLASTIC MOLDING MATERIAL

Donald J. Burke, East Cleveland, Ohio, assignor to Erico Products, Inc., Cleveland, Ohio, a corporation of Ohio Filed Aug. 31, 1955, Ser. No. 531,734

8 Claims. (Cl. 154—53.6)

This invention relates as indicated to novel plastic molding material and a method of preparing the same, and more particularly to plastic molding material in the form of a continuous elongated element or "rope" adapted to be coiled upon reels or otherwise stored and thereafter utilized in molding operations.

In recent years there has been increasing interest in thermosetting synthetic plastic materials reinforced with filaments such as sisal, cotton string and glass fiber, particularly the latter. Thus, for example, various well-known polyesters, silicones, epoxy resins, and alkyd resins may be mixed with short staple glass fiber chopped to lengths on the order of ¼ inch, for example, and employed in the molding of a wide variety of products such as bottle caps, threaded bushings, arc welding electrode holder handles, etc. The finished products have proven very satisfactory in use, combining good impact resistance with attractive appearance, electrical insulating qualities and the like, but they have involved considerable problems in manufacture which have rendered them so costly that they often cannot be competitively priced except where their superior properties are really essential for the use contemplated. It is customary to mix the resin in a semi-liquid state with the chopped glass fiber or like reinforcing filamentous material to produce a somewhat putty-like mass which must then be divided into small units to serve as the individual molding charges. Because of the messy character of this material, about the only practical way of preparing such charges has been to detach portions from the mass and to weigh and adjust these on a balance until the proper size charge has been obtained. This is obviously a slow, tedious and expensive operation.

It is accordingly a principal object of my invention to provide a plastic molding material in a form suitable for use in automatic molding operations.

Another object is to provide chopped fiber reinforced thermosetting synthetic plastic molding materials in a form suitable for employment in automatic molding operations.

A further object is to provide a method of producing an elongated "rope" of chopped fiber reinforced plastic material suitable for storage on reels and subsequent employment in molding operations.

Still another object is to provide such plastic rope which is reinforced in a manner to prevent breakage during subsequent handling despite inclusion of a very high percentage of chopped fiber or other filler material therein.

Other objects of the invention will appear as the description proceeds.

To the accomplishment of the foregoing and related ends, said invention then comprises the features hereinafter fully described and particularly pointed out in the claims, the following description and the annexed drawing setting forth in detail certain illustrative embodiments of the invention, these being indicative, however, of but a few of the various ways in which the principle of the invention may be employed.

In said annexed drawing:

Fig. 1 is a diagrammatic view illustrating one mode of carrying out the process of this invention;

Fig. 2 is a transverse section through the extruded product or rope;

Figs. 3 and 4 are similar transverse sections illustrating products having multiple concentrations of reinforcing strands therein;

Fig. 5 is a similar transverse section through a further modification of such product having a continuous "skin" formed thereon;

Fig. 6 is a transverse section through a modified form of my new rope;

Fig. 7 shows a length of my new plastic rope coiled in a flat coil or spiral suitable for use in certain molding operations; and Fig. 8 is a fragmentary detail view of the extrusion die assembly on an enlarged scale.

Referring now more particularly to Fig. 1 of the drawing, the apparatus there diagrammatically illustrated comprises a conventional plastic extruder of the piston-cylinder type including a cylinder 1, a piston 2, a cylinder head 3 and a die 4 secured to such head. An internal guide tube 5 within such die provides a curved passageway 6 communicating with laterally projecting portion 7 whereby material may be introduced within the die 4 and centered therein for passage outwardly with the extruded material. The end of passage 6 will ordinarily be aligned with the axis of the die opening and tube 5 will be shaped to permit smooth flow of the extruded material therepast with subsequent merging of the same so that the extruded product will be of solid cylindrical section, for example.

The operation will first be generally described, certain selected materials, however, being mentioned for purposes of illustration only, it being understood that the invention is not intended to be limited thereto. Thus, a synthetic plastic material such as a thermosetting alkyd resin may be intimately mixed with chopped glass fiber having a staple length on the order of ¼ inch, as well as with the usual curing catalyst and fillers such as clay, antimony oxide and coloring materials. The chopped glass fiber may constitute as much as 55% of the total product, 30% to 40% being preferred as affording very good strength to the finished molded product without deleteriously affecting the appearance of the same. This uncured thermosetting resin mixture does not hang together very well due to the high glass fiber content and has accordingly been very difficult to handle in the past. It is introduced into cylinder 1 of the extruder. A coil or ball 8 comprising continuous lengths of glass fiber filaments is provided adjacent the extruder and the continuous assemblage or hank of strands 9 is withdrawn therefrom and passed beneath roller 10 in small tank 11 containing a bath 12 of the resin in liquid or semi-liquid form capable of thoroughly wetting and coating the strands passing therethrough. This resin will ordinarily be the same resin as that employed in the mix which comprises the batch 13 in cylinder 1. Such coated glass fiber strands pass through guide tube 5 and are withdrawn centrally of die 4.

The extrusion operation may now be commenced through actuation of piston or plunger 2 by fluid pressure piston-cylinder assembly C to force the plastic mix through the opening in die 4 in the form of a continuous element or rope 14. The coated glass fiber strands 9 are entrained in the mix as it passes through the die and drawn along therewith to form a continuous central reinforcing core. The various parts of the extruder may be water cooled if necessary to avoid overheating of the resin during the extrusion operation. Pressure rolls 15 and 16 having opposed concave faces may engage the extruded rope 14 adjacent die 4 to smooth and compact the outer surface of such rope and a powder such as zinc stearate may be introduced on the outer surface of the rope at this station. The rope thus formed has sufficient tensile strength to permit it to be wound upon reel 17 from which it may subsequently be withdrawn for employment in molding operations.

Rope 14 as thus produced and as also illustrated in section in Fig. 2 may commonly be about 1 inch in thickness, although a wide variety of sizes and shapes are, of course, feasible. The central reinforcing element 9 will ordinarily comprise a group of parallel untwisted glass fibers which may comprise only one or two percent by weight of the total body. Their high tensile strength serves to reinforce the extruded putty-like rope and prevent breaking of the latter but in actual volume such continuous strands or filaments are inconsequential in contrast to the chopped glass fiber uniformly distributed through the mix and do not show any discernible concentration of fibers in the finished molded products produced therefrom.

It is, of course, feasible to introduce a number of such assemblages of glass fiber or like stranded material as illustrated in Figs. 3 and 4 of the drawing where 18, 19, 20, 21, 22, 23, 24 and 25 indicate the positions of such continuous reinforcing elements. While not ordinarily necessary, the extruded mix may also be somewhat reinforced and made easier to handle by slightly precuring the outer surface thereof to produce a thin continuous skin 26 (Fig. 5). This may conveniently be achieved under the necessary carefully controlled conditions by passing the extruded mix past infra-red lamps. If carefully controlled, such dried and very slightly cured continuous skin may be of considerable benefit in certain cases but it is, of course, very important that overcuring should be avoided since otherwise the thermosetting material may be rendered useless for employment in the subsequent molding operation.

As indicated in Fig. 6, die 4 may be in a variety of shapes depending upon the size and shape of the molding dies in which the material is subsequently to be molded. Thus, the continuous rope 27 shown in cross-section in Fig. 6 may be of elongated cross-section with reinforcing strands 28, 29 and 30 embedded therein in an array corresponding generally to the proportions of the rope. For general purposes, however, a rope of circular cross-section will usually be found entirely satisfactory and more easily coiled upon a reel.

While relatively flat molded articles or sheets may be produced from sections cut from continuous extruded material of the type generally indicated in Fig. 6, such articles may also be produced utilizing plastic rope of the Fig. 2 type, for example, which has been formed into a flat spiral coil as shown in Fig. 7, or short lengths of such rope may be placed side by side in the mold. Other methods of utilizing my preformed molding material will be apparent to those skilled in the art.

A principal advantage of my new invention is to be found in the utilization of plastic materials, and more particularly thermosetting resins, containing large quantities (over 25% by weight) of fibrous reinforcing filler materials, particularly chopped glass fiber. Such fibrous filaments may be of various lengths, commonly from ⅛ inch to 2 inches, but in the case of glass fiber, ¼ inch is usually preferred. Suitable fibrous materials thus employed and well known in the art include the following: glass fiber, sisal, cotton cord either braided or twisted, and cotton fibers.

A preferred example of a thermosetting resin mix which I have found particularly satisfactory for employment in accordance with my invention is the following:

100 parts of A+35 parts of B+42.8 parts of C

| | | Percent |
|---|---|---|
| A. | Maleic anhydride | 30 |
| | Phthalic anhydride | 22 |
| | Ethylene glycol | 26 |
| | Diethylene glycol | 22 |
| B. | Fumaric acid | 34 |
| | Ethylene glycol | 13 |
| | Isopropylidene bis-(p-phenyleneoxypropanol-2) | 53 |
| C. | Vinylbenzene monomer (styrene) | |

About 1% by weight of benzoyl peroxide may be incorporated as a catalyst. Other suitable catalysts for the thermosetting polyester resins include Methyl ethyl ketone peroxide
Dibenzaldiperoxide
t-Butyl hydroperoxide
t-Butyl perbenzoate
t-Butyl perphthalic acid Small quantities of cobalt naphthenate or manganese naphthenate may also be incorporated to serve as promoters in a manner well known to those skilled in the art. Suitable fillers include calcium carbonate, aluminum silicate, calcium silicate, and potassium aluminum silicate. The quantities employed may vary rather widely, from 20% to 60% by weight often being employed, and together with the reinforcing material (ordinarily glass fiber) will desirably render the plastic material non-sticky and putty-like in character. It will be understood that I utilize resin compositions well known in the art and which are not per se of my invention, the present invention relating principally to the manner of modifying the plastic material by inclusion of unusually large proportions of the chopped fibrous reinforcing material and by inclusion of the continuous compatible reinforcing element such as 9. For various molding operations the well-known phenolic, epoxy, silicone and melamine resins may also be utilized, although I generally prefer the thermosetting polyester resins.

In general, the resin content of the putty-like compositions will not exceed about 35% by weight and the glass fiber content will vary from about 5% to about 55% by weight. The high chopped fiber content feasible greatly increases the strength of the molded products and the continuous rope form is suitable for convenient storage and intermittent feeding to molding machines. The handling problem which formerly gave rise to so much inconvenience and expense is substantially eliminated. The term "rope" as used herein and in the claims is intended to include the continuous elongated plastic molding elements of my invention regardless of the particular cross-sectional form of the same.

Other modes of applying the principle of the invention may be employed, change being made as regards the details described, provided the features stated in any of the following claims or the equivalent of such be employed.

I therefore particularly point out and distinctly claim as my invention:

1. A plastic molding compound comprising an elongated flexible rope of thermosetting plastic molding material containing from 5% to 55% by weight of short staple fiber reinforcing material admixed therewith and a continuous filamentous reinforcing element longitudinally thereof.

2. The material of claim 1 wherein said short staple fiber is glass fiber.

3. The material of claim 1 wherein said short staple fiber is glass fiber and said continuous reinforcing element is also glass fiber.

4. The material of claim 1 wherein said short staple fiber is glass fiber and said continuous reinforcing element is also glass fiber, the latter constituting no more than 2% by weight of the total composition.

5. The material of claim 1 wherein said short staple fiber is glass fiber and said continuous reinforcing element is also glass fiber, the latter constituting no more than 2% by weight of the total composition and being substantially straight and untwisted.

6. A plastic molding compound comprising an elongated flexible rope of uncured thermosetting plastic molding material containing at least 25% by weight of short staple glass fiber from about ⅛ inch to about 2 inches in length uniformly admixed therewith, and a continuous internal longitudinally extending filamentous reinforcing element also of glass fiber.

7. A plastic molding compound comprising an elongated flexible rope of uncured thermosetting plastic molding material containing at least 30% by weight of short staple glass fiber from about ⅛ inch to about 2 inches in length admixed therewith, said molding material being putty-like and of low tensile strength, and a continuous internal longitudinally extending filamentous reinforcing element also of glass fiber substantially untwisted and comprising not more than about 2% by weight of the composition.

8. A plastic molding compound comprising an elongated flexible rope of plastic molding material containing at least 25% by weight of short staple fibrous material dispersed therein, said flexible rope having a superficial continuous skin of relatively strong slightly precured plastic material still susceptible to a subsequent molding operation, and a continuous internal longitudinally-extending filamentous reinforcing element.

References Cited in the file of this patent

UNITED STATES PATENTS

| | | |
|---|---|---|
| 653,242 | Holt | July 10, 1900 |
| 1,780,122 | Felix | Oct. 28, 1930 |
| 1,802,605 | Kemp | Apr. 28, 1931 |
| 2,028,240 | Palmer | Jan. 21, 1936 |
| 2,312,579 | O'Brien | Mar. 2, 1943 |
| 2,409,660 | Briggs | Oct. 22, 1946 |
| 2,428,654 | Collins | Oct. 7, 1947 |
| 2,457,088 | Pinney | Dec. 21, 1948 |
| 2,475,083 | Davis | July 5, 1949 |
| 2,531,843 | Durey et al. | Nov. 28, 1950 |
| 2,571,715 | Henning | Oct. 16, 1951 |
| 2,648,098 | McElligott | Aug. 11, 1953 |
| 2,682,292 | Nagin | June 29, 1954 |
| 2,688,774 | Malinowski et al. | Sept. 14, 1954 |
| 2,698,269 | Sussenbach | Dec. 28, 1954 |
| 2,701,054 | Howald et al. | Feb. 1, 1955 |
| 2,732,423 | Morrison | Jan. 24, 1956 |

FOREIGN PATENTS

| | | |
|---|---|---|
| 436,947 | Great Britain | Oct. 14, 1935 |
| 150,869 | Australia | Apr. 14, 1953 |